US007782384B2

(12) United States Patent
Kelly

(10) Patent No.: US 7,782,384 B2
(45) Date of Patent: Aug. 24, 2010

(54) DIGITAL CAMERA HAVING SYSTEM FOR DIGITAL IMAGE COMPOSITION AND RELATED METHOD

(76) Inventor: Douglas J. Kelly, 12854 Mackenzie Dr., Tustin, CA (US) 92782-0923

( * ) Notice: Subject to any disclaimer, the term of this patent is extended or adjusted under 35 U.S.C. 154(b) by 1191 days.

(21) Appl. No.: 10/982,645

(22) Filed: Nov. 5, 2004

(65) Prior Publication Data

US 2006/0098112 A1    May 11, 2006

(51) Int. Cl.
*H04N 5/222* (2006.01)
(52) U.S. Cl. ............................. 348/333.01; 348/333.03; 348/333.11; 348/333.12; 382/163; 382/284
(58) Field of Classification Search ............ 348/333.12, 348/239, 576, 333.09, 252, 333.04, 231.2, 348/231.6, 333.01–333.03, 333.05, 586; 382/163, 284
See application file for complete search history.

(56) References Cited

U.S. PATENT DOCUMENTS

| 4,837,633 | A | 6/1989 | Parra |
| 5,019,854 | A | 5/1991 | Mukai et al. |
| 5,309,243 | A | 5/1994 | Tsai |
| 5,689,742 | A | 11/1997 | Chamberlain, IV |
| 5,828,793 | A | 10/1998 | Mann |
| 5,873,007 | A | 2/1999 | Ferrada Suarez |
| 5,897,228 | A | 4/1999 | Schrock |
| 5,913,088 | A | 6/1999 | Moghadam et al. |
| 6,074,111 | A | 6/2000 | Kasahara |
| 6,201,571 | B1 * | 3/2001 | Ota ............................. 348/239 |
| 6,456,323 | B1 | 9/2002 | Mancuso et al. |
| 6,486,914 | B1 | 11/2002 | Anderson |
| 6,504,575 | B1 | 1/2003 | Ramirez et al. |
| 6,532,039 | B2 * | 3/2003 | Anderson ................ 348/231.3 |

(Continued)

FOREIGN PATENT DOCUMENTS

EP    0 853 426 A2    7/1998

(Continued)

OTHER PUBLICATIONS

Nikon Coolpix 3100, Apr. 7, 2003 Review by Mike Collins, 26 pages.

(Continued)

*Primary Examiner*—David L Ometz
*Assistant Examiner*—Antoinette T Spinks
(74) *Attorney, Agent, or Firm*—Tsircou Law, P.C.

(57) ABSTRACT

A digital camera is provided, comprising an image system having a unique combination of features that aid in generating creative, high-quality images. The system presents a variety of overlays, each having prescribed attributes, e.g., ranging in size, opacity, and functionality, and from iconic overlays to full-scale overlays having varied opacity. The overlays can be used as an aid in composing a live image for digital capture, either as a constant or intermittent presence on the viewscreen of the camera. In an exemplary embodiment, the camera can create a composite photograph in which a live image and the overlay are combined together. In an independent aspect, the camera can include an auto-compositing feature that aids in creating images free of improperly exposed regions. Thus, a photographer can create and combine images "on location" in a unique manner.

30 Claims, 13 Drawing Sheets

U.S. PATENT DOCUMENTS

| | | |
|---|---|---|
| 6,539,177 B2 * | 3/2003 | Parulski ...................... 396/287 |
| 6,606,117 B1 | 8/2003 | Windle |
| 6,677,981 B1 | 1/2004 | Mancuso et al. |
| 2001/0013896 A1 | 8/2001 | Anderson |
| 2002/0176011 A1 | 11/2002 | Kuwayama |
| 2003/0122950 A1 | 7/2003 | Anderson |
| 2003/0152263 A1 | 8/2003 | Kawano et al. |
| 2003/0169350 A1 | 9/2003 | Wiezel et al. |
| 2004/0012702 A1 | 1/2004 | Ishige |
| 2004/0197021 A1 * | 10/2004 | Huang et al. ................ 382/162 |
| 2004/0207734 A1 | 10/2004 | Horiuchi |
| 2005/0024517 A1 * | 2/2005 | Luciano ................ 348/333.03 |

FOREIGN PATENT DOCUMENTS

| | | |
|---|---|---|
| EP | 1 526 727 A1 | 4/2005 |
| WO | WO-99/14941 | 3/1999 |
| WO | WO-03/083773 A2 | 10/2003 |

OTHER PUBLICATIONS

Optio 550 Operating Manual, 6 pages.

* cited by examiner

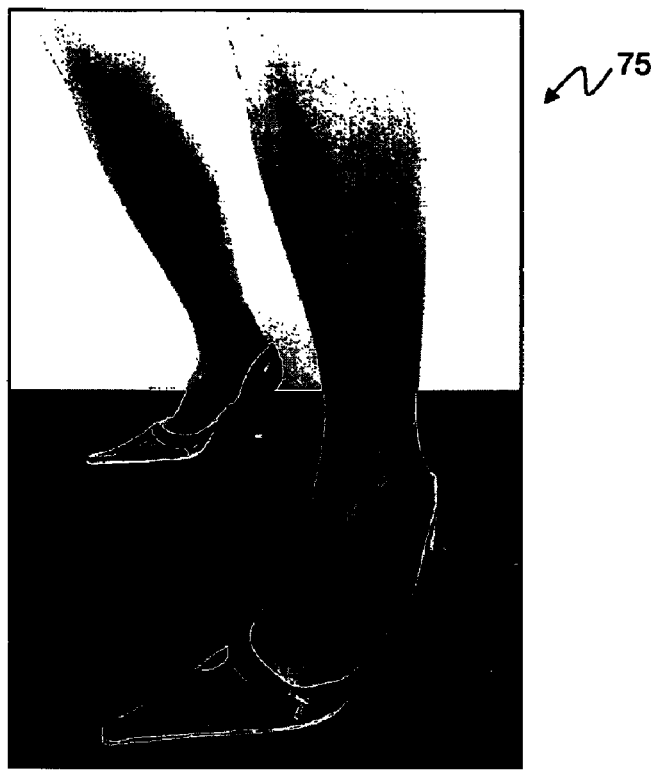
FIG. 15A
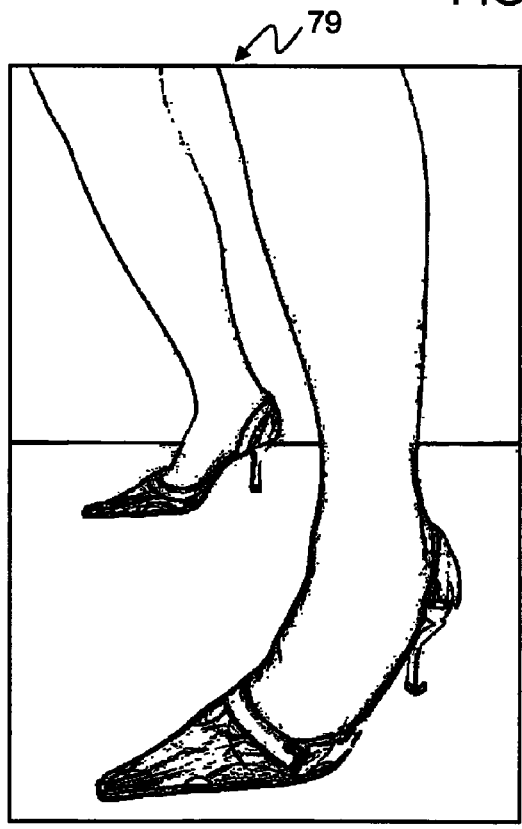 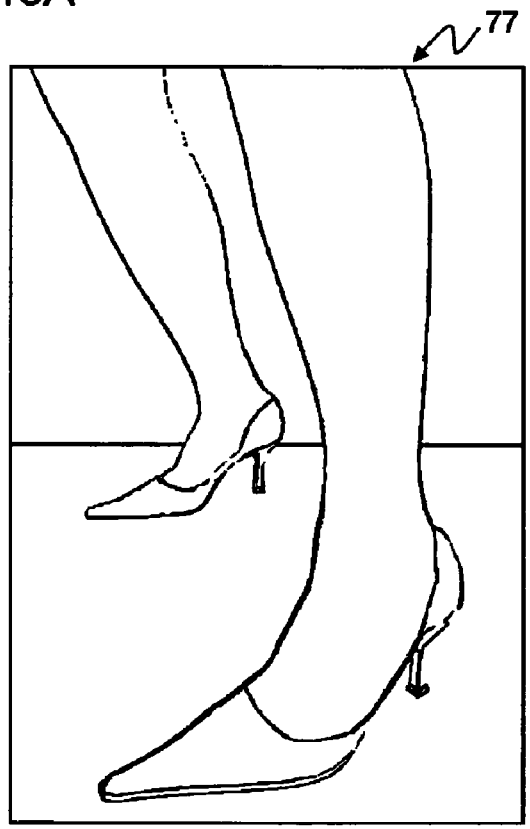
FIG. 15B  FIG. 15C

213  FIG. 18A

DIGITAL CAMERA HAVING SYSTEM FOR DIGITAL IMAGE COMPOSITION AND RELATED METHOD

BACKGROUND OF THE INVENTION

The present invention relates generally to photography and, more particularly, to composition of digital photographs.

Photography has long been a popular medium of creative expression. In traditional photography, factors such as composition and exposure settings, all contribute to creating an esthetic photograph. Of these, composition is a particularly important consideration. To aid in composition of the subject, cameras typically include indicia such as cross-hairs, grid lines, or the like, to help the photographer in alignment. In traditional film cameras the alignment indicia typically are etched on a screen of a viewfinder assembly. In digital cameras, the alignment indicia typically are presented as iconic images on a view-screen, commonly an LCD screen, atop the live image, thereby serving as reference in aligning the subject of the photograph.

More recently, some digital cameras include several indicia schemes, providing various configurations of indicia to aid the photographer in composing the photograph. The various schemes typically are geared for a particular photographic composition such as a one-person portrait or a two-person portrait. Some digital cameras can be prompted to depict the indicia on the resulting photograph, if desired. Thus, such photographs include a composite of the live image from the camera and the indicia. For example, some cameras provide overlays having the current date and time, serving as a time stamp for the photograph. Some digital cameras have provided factory-installed overlays, simply for comical effect. For example, overlays have been provided that depict a contrived magazine cover having a blank spot for a person's head. In use, the overlay is depicted on the view screen of the camera. The photographer aligns the camera such that the subject's head is positioned within the blank spot of the overlay, and then takes the picture. As a result, a photograph is generated depicting the subject on the cover of a magazine.

Similarly, it can be desired to compose multiple images in a single photograph. For example, certain film cameras allow a photographer to expose a single frame of film multiple times. This "multi-exposure" mechanism allows a photographer to open the shutter multiple times without advancing the film between the exposures. Light from each of the exposures is recorded onto a single frame of film. However, the results are often dependent on the photographer precisely controlling many aspects of the composition or at least making an educated guess regarding alignment of the stored image with the live image in the viewfinder. Insofar as the photographer is unable to precisely recall the prior photograph, the quality of the resulting composite is left to chance. If an error is made on either exposure, both exposures are typically rendered useless.

In contrast, in digital photography, multiple-exposure photographs typically are created in post processing. For example, a photographer will capture separate digital images. Then, using a personal computer running software for digital image editing (e.g., Adobe® Photoshop® available from Adobe Systems, Inc), the photographer will composite the separate images into a single image. During this process, the photographer typically will need to register the images so that corresponding features within the images are properly aligned. Since each image was taken separately, there is a good bit of guesswork involved in composing each image. Thus, it is common that the contents of the images will not align precisely. During post processing, portions of each image typically must be cropped to conform the images, which can eliminate desired aspects of the image.

A post processing method called compositing can also be used to refine improperly exposed images. When a photographer tries to capture an image with a large disparity between bright and dark regions it is common for the bright areas to overexpose to excessive lightness and/or for the dark areas to underexpose to excessive darkness. The traditional solution to this problem is to put the camera on a tripod and shoot multiple images at a range of different shutter and/or aperture settings. Then in post processing, the images are composited together, which can be tedious and time consuming. Even utilizing this approach, it is possible to make exposure errors which might not be detected until the editing process. However, by that time, arranging to remake the photograph might be difficult or impossible. Thus, despite the aforementioned advancements in photography, a certain amount of good fortune is needed to achieve a desired esthetic in a photograph composed of multiple exposures. Post processing can be complicated and prone to failure due to errors made at the time of exposure.

It should, therefore, be appreciated that there remains a need for a system of digital image composition that allows users to create, modify, or personalize digital images from a digital camera to include image composition and image exposure without undue reliance on post processing. The present invention fulfills this need and others.

SUMMARY OF THE INVENTION

The invention provides a system for digital composition usable with a digital camera providing image overlays that enable the photographer to create and combine images in a unique manner. By way of example, the handheld digital camera includes a plurality of files stored in digital memory. Each file can be used as an overlay that has a user-assignable opacity corresponding to the field-of-view of the camera such that the opacity of the overlay controls the clarity of the image data as presented on the view-screen. The camera implements a user interface presented on the view-screen to enable creation of overlays and selection of overlays from the plurality of files. Thus, a photographer can create and combine images "on location" in a unique manner.

Optionally, the overlays can be used as an aid in composing a live image for digital capture, either as a constant or intermittent presence on the view-screen of the camera. Also, the camera can be configured to save two digital files to the digital memory upon taking a photograph, the first file comprising the image data corresponding to the field-of-view of the camera and the second file comprising a composite image of the overlay superimposed on the image data corresponding to the field-of-view of the camera.

In an exemplary embodiment, the camera can present a variety of overlays, each having prescribed attributes, e.g., ranging in size, opacity, and functionality. For example, an overlay can be configured such that its assigned opacity level affects the entirety of a resulting image. The user interface can be configured to modify attributes of the stored files. For example, modification of an overlay can be achieved by removing a first color from the overlay. The user interface can further enable sizing and positioning of the overlay for use relative to the image data from the field-of-view of the camera.

In a detailed aspect of an exemplary embodiment, the plurality of files includes at least one print overlay having two region of differing opacity, including an open region and a shaded region, the shaded region of the overlay having a reduced opacity relative to the open region, the open region having a prescribed aspect ratio corresponding to a photograph print size. Optionally, multiple print overlays would be available, wherein the open region of each print overlay has a distinct aspect ratio, (e.g., 8×10 and 4×6).

In another detailed aspect of an exemplary embodiment, the user interface enables automated creation of a line overlay from an image file via an edge-detect feature in which the line overlay is a line drawing of the image file. The edge-detect feature analyzes the image file by identifying borders between regions of differing color and tone of a prescribed value, and defines, in the line overlay, a line of prescribed opacity and color corresponding to the identified border. Optionally, the user can set the prescribed value used for identifying the border between regions in the image file. Also, the user can set the opacity value and the color for the line overlay.

In a preferred method of generating an overlay with a digital camera, a user selects a stored image from digital memory. The image is presented on a view-screen of the camera. The user may assign an opacity level to this overlay via a user input device of the digital camera. A user input device is used to designate a region of the stored image to be erased. The resultant image is saved to digital memory for use as an overlay. When used, a portion of the live image corresponding to the erased region is unaffected by the overlay.

In an independent aspect of the invention, a method for image composition using a handheld digital camera comprises the steps of:

capturing multiple digital images in automated sequence using a digital camera, each image captured at a distinct exposure setting, the digital camera having a processor assembly and a digital sensor assembly in communication with the processor, the sensor assembly having a prescribed sensing range beyond which a captured image will have over- or under-exposed regions;

analyzing a first digital image of the multiple digital images for over- or under-exposed regions;

identifying properly exposed regions in the remaining digital images of the multiple digital images corresponding in location to the over- or under-exposed regions of the first digital image, the identifying step performed by the processor assembly of the camera;

automated compositing of properly exposed regions identified in the first digital image and the remaining digital images of the multiple digital images, resulting in a composite image in which the identified regions replace the corresponding over- or under-exposed regions of the first digital images; and storing the composite image in digital memory of the camera.

In an exemplary embodiment, the method further comprises, prior to the capturing multiple images step, analyzing an image taken as a single exposure for over- or under-exposed regions and, if found, prompting user to initiate the capturing multiple images step.

In a detailed aspect of an exemplary embodiment, the identifying and automated compositing steps further include: (a) selecting a second digital image of the multiple digital images having at least one properly exposed region corresponding in location to an over- or under-exposed region of the first digital image; (b) automated compositing of all regions from the second digital image region corresponding in location to all over- or under-exposed region of the first digital image with the remaining portions of the first digital image; and (c) repeating steps (a) and (b) with the resultant image from the prior step (b) and a third digital image of the multiple digital images.

In another detailed aspect of an exemplary embodiment, the method further includes storing the multiple digital images that were captured in automated sequence for later use.

In yet another detailed aspect of an exemplary embodiment, the method further includes automated deletion of the multiple digital images following completion of the composite image.

For purposes of summarizing the invention and the advantages achieved over the prior art, certain advantages of the invention are described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the exemplary embodiments having reference to the attached figures, the invention not being limited to any particular embodiment disclosed.

BRIEF DESCRIPTION OF THE DRAWINGS

Embodiments of the present invention will now be described, by way of example only, with reference to the following drawings in which:

FIG. 15A is an exemplary scaled-tone image taken by the camera of FIG. 1.

FIG. 15B is an exemplary line overlay derived from the image of FIG. 15A, using the edge-detect feature of the camera of FIG. 1.

FIG. 15C is a refined line overlay derived from the FIG. 15B, having extraneous marks removed using edit feature of the camera of FIG. 1.

FIG. 18A is an image, similar to FIG. 17A, captured by the camera of FIG. 1 at a first exposure setting.

DETAILED DESCRIPTION OF THE PREFERRED EMBODIMENTS

Figure 1:
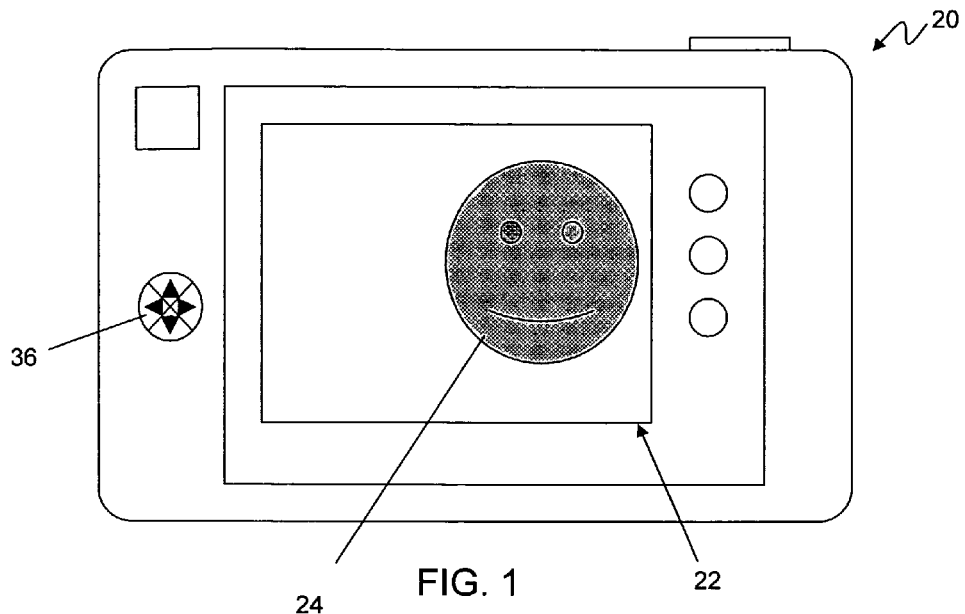
FIG. 1 is a rear view of a digital camera in accordance with the present invention, depicting a first overlay having a selected opacity level and presented on a view-screen of the camera.
Figure 2:
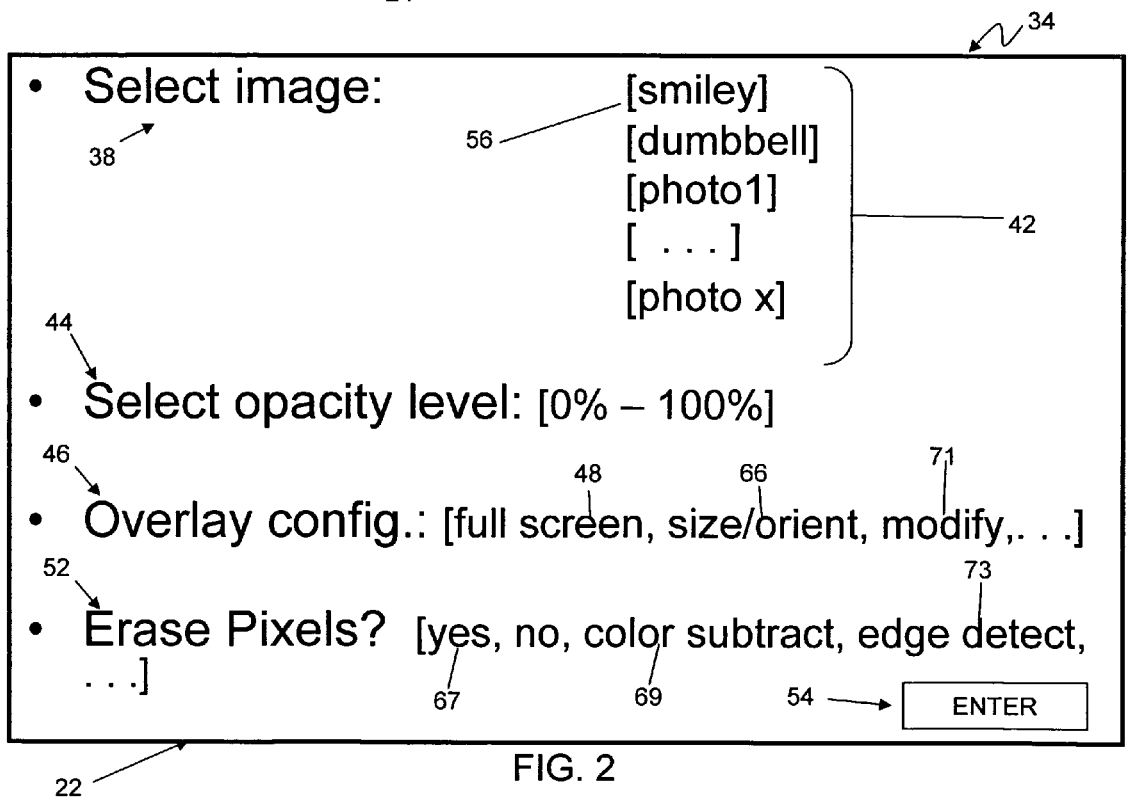
FIG. 2 is screen shot of the view-screen of the camera of FIG. 1, depicting an overlay menu of a user interface for selecting and setting an image overlay.
Figure 3:
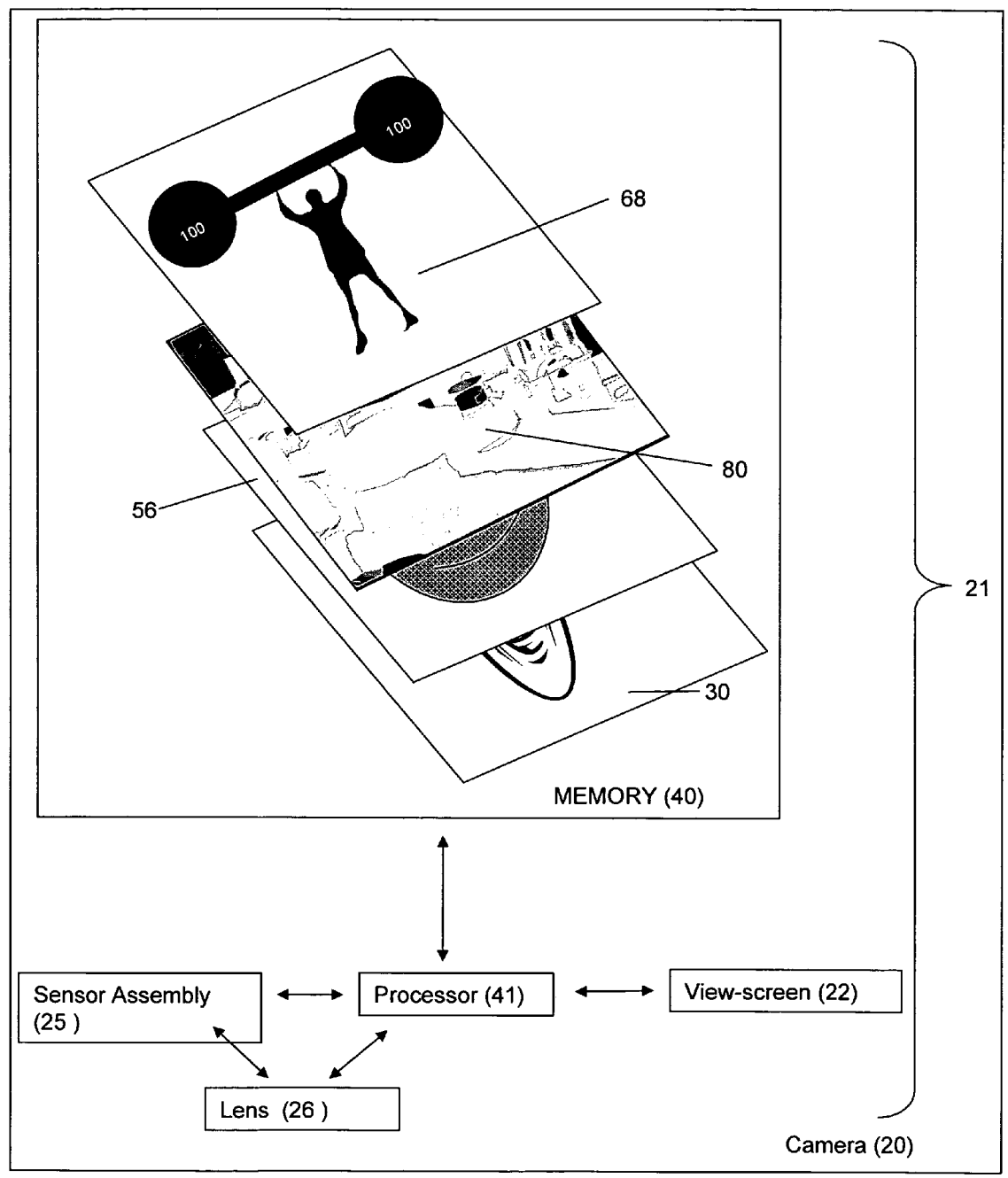
FIG. 3 is a simplified block diagram of the digital camera of FIG. 1, depicting the memory having a plurality of image files usable as overlays.

Referring now to the drawings, and particularly FIGS. 1-3, there is shown a digital camera 20 comprising an image system 21 having a unique combination of features that aid in generating creative, high-quality images. The system includes a set of digital files stored in camera memory 40 (FIG. 3) that can be presented as overlays (e.g., first overlay 24). The system can present a variety of overlays, each having prescribed attributes, e.g., ranging in size, opacity, and functionality, from iconic overlays to full-scale overlays having varied opacity. The overlays can be used as an aid in composing a live image for digital capture, either as a constant or intermittent presence on the view-screen 22 of the camera. Also, the system can create a composite photograph in which a live image and the overlay are combined together. The system further includes an auto-compositing feature that aids in creating images free of improperly exposed regions, which is discussed in detail further below. Thus, a photographer can create and combine images "on location" in a unique manner, creating high-quality photographs.

With reference to FIG. 2, a photographer can create or select an overlay having a desired combination of attributes via an overlay menu 34. The menu provides a number of queries to guide the photographer through the process. The photographer interacts with the menu using directional buttons 36 (FIG. 1) located to the left of the view-screen. The directional buttons preferably are used to scroll through the menu, highlighting and selecting items, as desired. Other embodiments are contemplated that allow the photographer to interact with the menu by various other means, e.g., touch-screen, stylus, joystick, and so on. At the first query 38, the photographer can select from any image stored in memory 40 (FIG. 3) for use as an overlay. The images are presented in a scrollable list 42 to the right of the query, allowing the photographer to select a desired image. In other embodiments, various other approaches can be taken to enable the photographer to create or select overlays or to access various other features in accordance with the invention, such as, use of file galleries depicted on the view-screen, presentation of a list of overlays, and so on.

Figure 5:
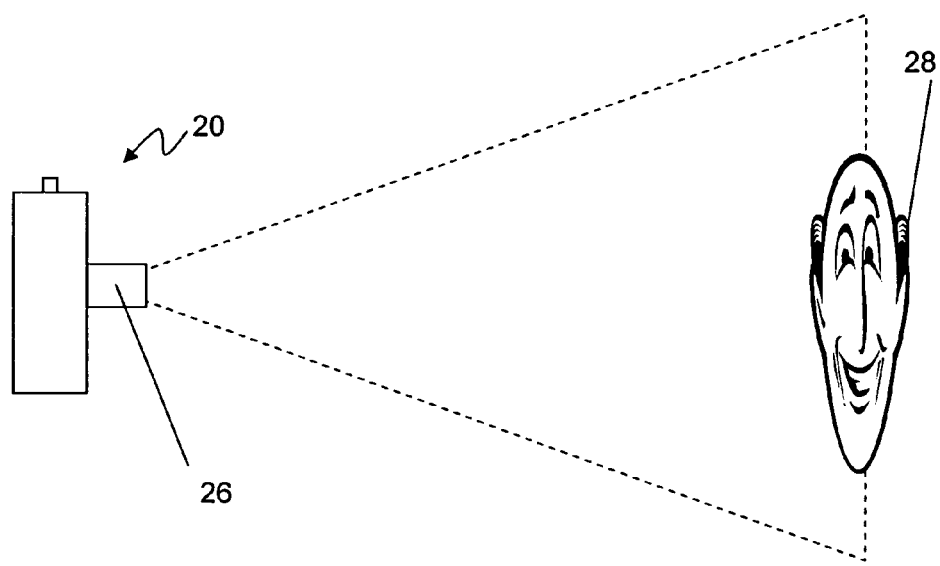
FIG. 5 is simplified view of the digital camera of FIG. 1 aligned to capture an image of a subject.

At a second query 44 of the menu, the photographer can set the opacity level to a desired percentage from 0 to 100 percent, as desired. The opacity level for the overlay controls the clarity through which the subject of the camera is viewed. For example, in a fully opaque image (100%) none of the underlying image is viewable. In use, the view-screen depicts both the live image received from the camera lens 26 and the overlay, superimposing the overlay atop the live image. The photographer can align the camera (FIG. 5), composing a photograph to combine the overlay and the subject 28 in a desired manner.

A third query 46 allows the photographer to further customize the overlay. For example, by selecting the "full screen" option 48, the overlay can be sized to correspond to the entire viewable area, as depicted on the view-screen. By selecting the "size/orient" option 66, the photographer can adjust the size and orientation of the overlay, to achieve a desired look. Also, "compare mode" presents the selected image overlay, whether opaque or translucent, by toggling between the selected image and the live image, i.e., rather than a constant depiction, the overlay is iteratively presented. This image toggling can take place automatically or initiated manually, e.g., via a toggle button.

A fourth query 52 is provided. This query allows the photographer to activate different editing features to further modify the overlay, even down to the pixel level. For example, the photographer can erase portions of the overlay to allow corresponding portions of the "live" image to be unaffected by the overlay, an example of which is discussed below with reference to FIGS. 10A-10C (i.e., the fifth example below). Once an overlay is configured, the "enter" icon 54 is selected, and the overlay is presented for use.

In use, the system enables a number of distinct overlays that provide unique features. As a result, the photographer can create creative, high-quality images, without having to be unduly dependent on post processing of the image to obtain a desired look. Instead, much of the guesswork is eliminated; the photographer has a greater ability to generate a desired image, to include composition and compositing, while in the field. To illustrate, exemplary overlays of the system are discussed below.

1. Small-Scale, Uniform Opacity Overlay

Figure 6:
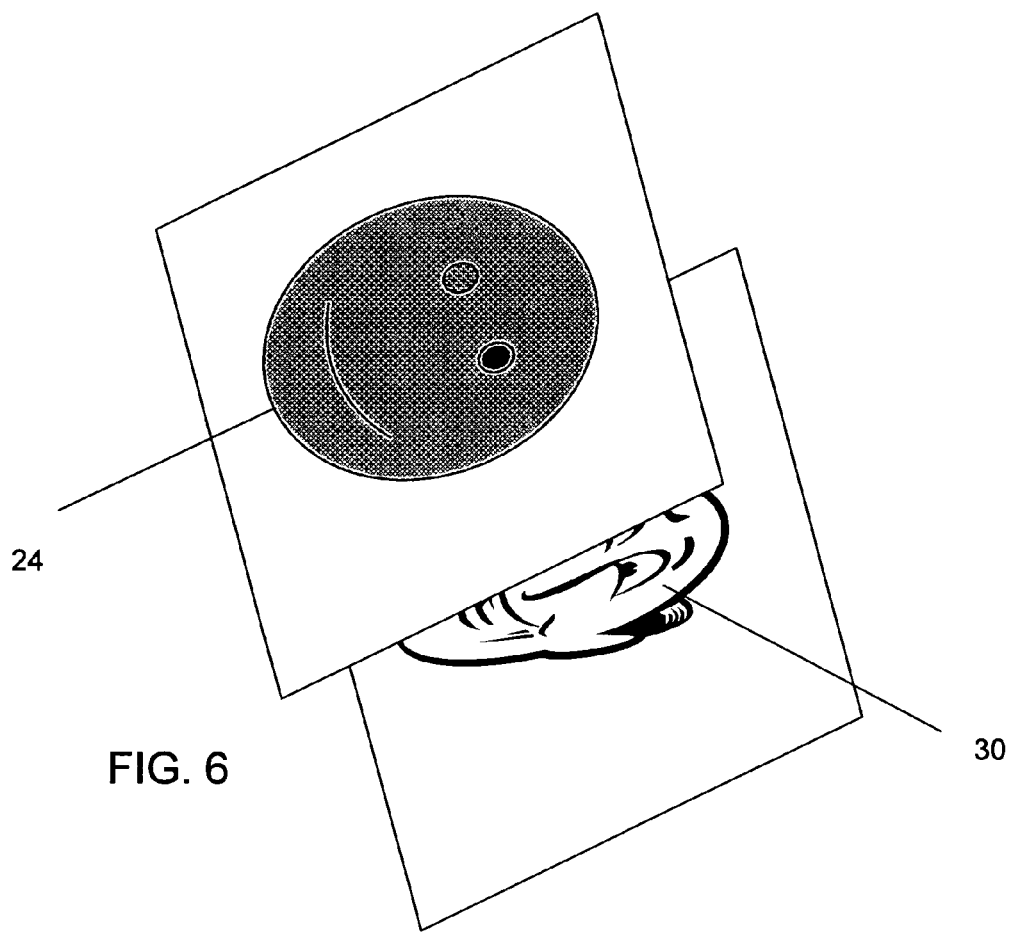
FIG. 6 is a representative view of the first image overlay superimposed atop the captured image from FIG. 5, forming a composite image incorporating both the first overlay and the captured image.
Figure 7:
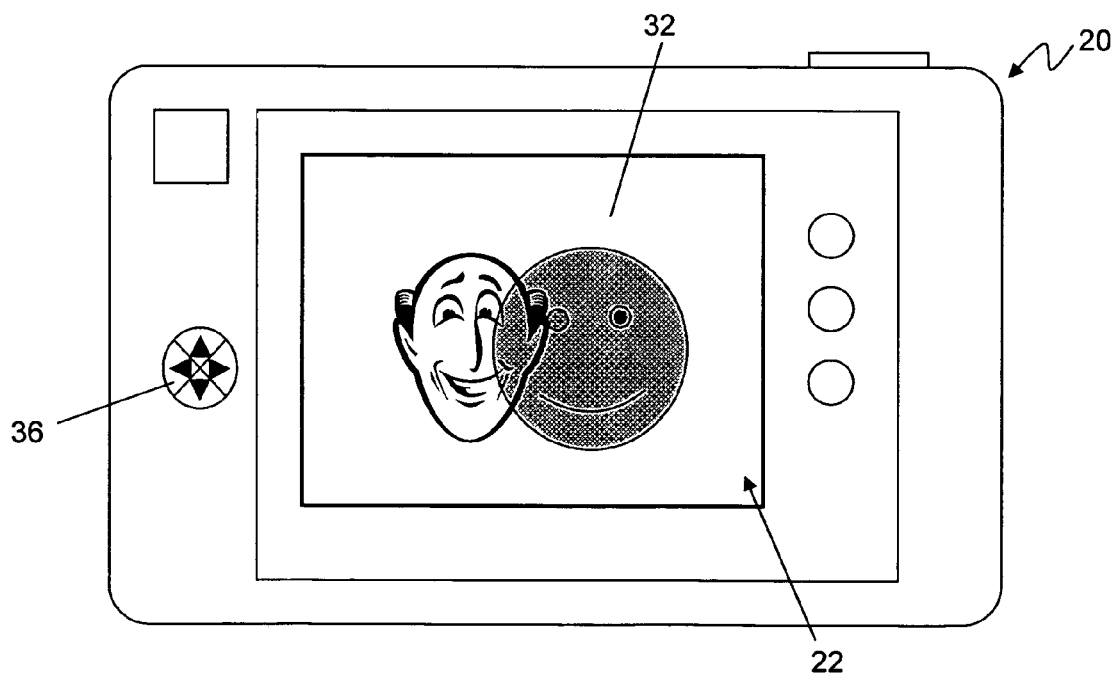
FIG. 7 is rear view of the camera of FIG. 1, depicting the composite image on the view-screen of the first image overlay and the captured image.

In a first example, a first overlay 24 (FIG. 1) depicting a "smiley face" is presented. The first overlay is sized to affect just a portion of the overall image and is semi-transparent. In use, the first overlay is presented on the view-screen 22 of the camera superimposed atop the live image received from the camera's lens 26 (e.g., FIGS. 6 and 7). Thus, the photographer can align the camera (FIG. 5), composing a photograph to combine the overlay and the subject 28 in a desired manner. In this example, the photographer decided to offset the head of the subject with the "smiley face," to create a composition similar to an infinity sign. The camera saves two digital files—the first file comprises an unaltered image 30 (FIG. 6) of the subject itself, and the second file is a composite image 32 (FIG. 7) of the overlay superimposed on the image of the subject. These files are then available for use as an overlay, if desired.

Figure 4:
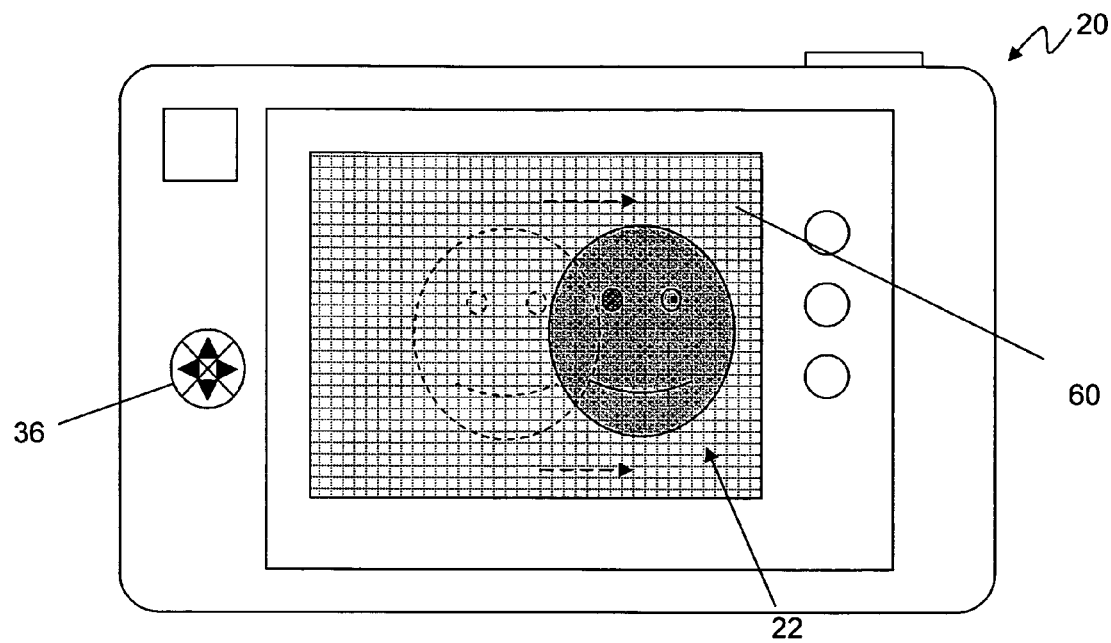
FIG. 4 is a rear view of the camera of FIG. 1, depicting an overlay against an alignment background.

To create the first overlay using the overlay menu 34 (FIG. 2), the "smiley" file 56 is selected and the opacity level is set at a prescribed percentage, e.g., 60 percent. By selecting the "size/orient" option 66, the smiley icon 56 will be depicted against an alignment background 60 (see FIG. 4). The alignment background includes a uniform field of black orthogonal gridlines on a gray background at a resolution corresponding to that of the digital sensor of the camera. Using the directional buttons 36, the smiley icon can be sized, positioned, and oriented, as desired. FIG. 4 depicts the smiley icon against an alignment background 60. Arrows are depicted in the figure only to indicate movement of the smiley icon from an initial location in the center of the view-screen to a final location. Once finished, the overlay menu 34 will be displayed again. The fourth query 52 is left at its default response of "no." If satisfied, the photographer selects the "enter" icon 54, and the image overlay is ready for use. Of course, these selections can remain as defaults associated with the "smiley" file or can be saved in any additional overlay file.

2. Small-Scale, Opaque Overlay

Figure 8:
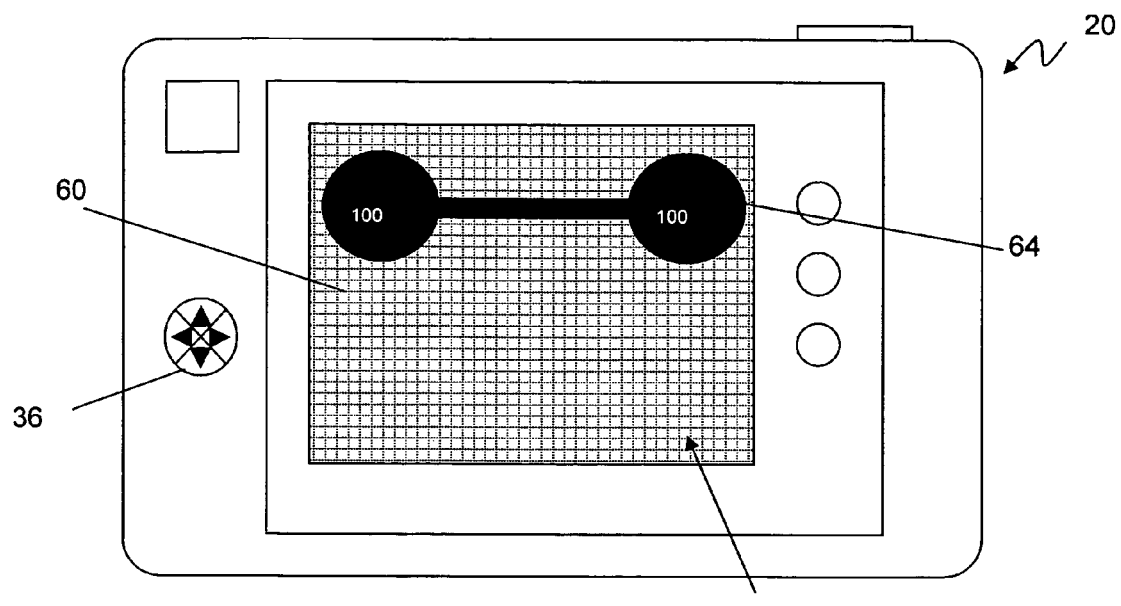
FIG. 8 is a rear view of the camera of FIG. 1, depicting a second image overlay presented on the view-screen.
Figure 9:
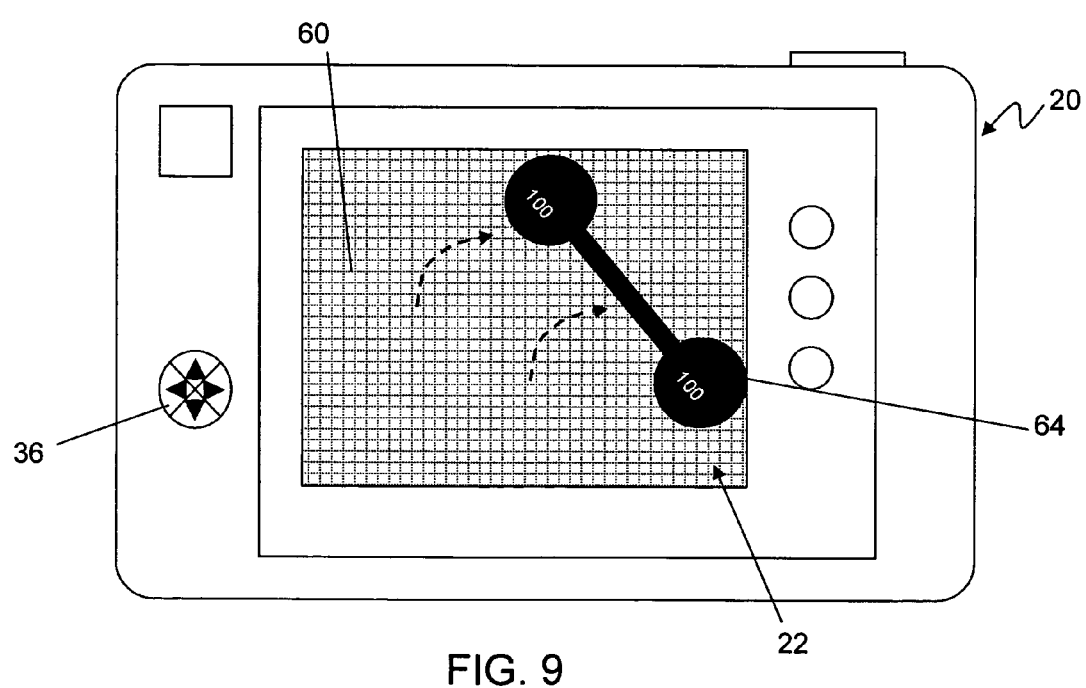
FIG. 9 is a rear view of the camera of FIG. 1, depicting the second image overlay of FIG. 8 reoriented by the photographer.

With reference now to FIGS. 8 and 9, a second overlay 64 in the form of dumbbell is depicted. The overlay is opaque, i.e., the underlying image is not viewable through the overlay. In FIG. 8, the dumbbell icon 64 is depicted in a default orientation in which it is oriented horizontally. FIG. 9, however, shows the dumbbell icon angled. This can be achieved using the "size/orient" option 66 of the overlay menu 34 (FIG. 2). As previously mentioned, when this option is selected from the overlay menu, the image identified at the first query is presented on the view-screen 22 against the alignment background 60. In this example, therefore, the dumbbell image is presented. Then, using the directional buttons 36, the dumbbell can be re-oriented. Once completed, the photographer can use the new overlay having the angled dumbbell.

Using the system 21 (FIG. 3), overlays formed of various different images can also be used, such as crosshairs, dots, circles, company logos, and so on. Moreover, the photographer can also select just a portion of an image for use as an overlay. For example, a flower can be "picked" out of a saved image and stored as an icon. The photographer can position one or more of the icons on the view screen. The user can choose to photograph against these icons "on-the-fly." The user can utilize the icons to align a composition and then save only live image data. The user may also choose to save any particular iconic arrangement as an overlay image for later use. The positioning of icons can occur against a variety of backgrounds which may selectively include, for example, a live image, a stored image, a neutral background, or an alignment grid.

3. Full-Scale, Uniform Opacity Overlay

Figure 11:
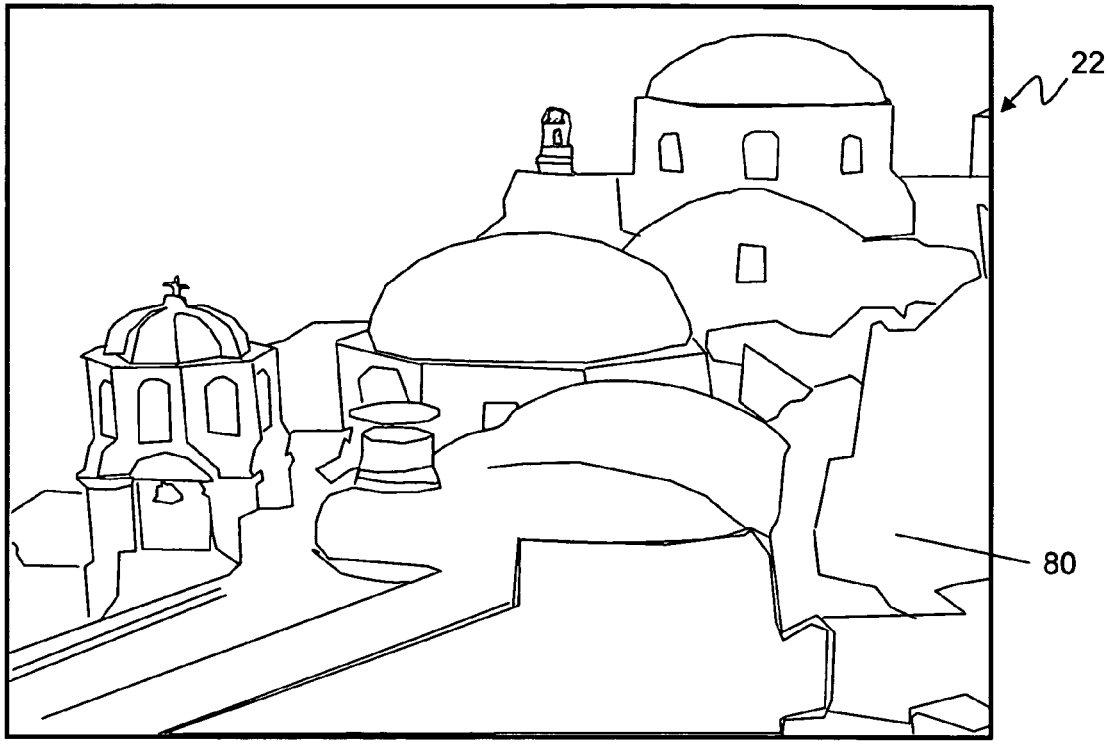
FIG. 11 is a screen shot of the view-screen of the camera of FIG. 1, depicting a scenic image captured by the camera.

With reference to FIG. 11, a third example is provided of a full-scale, semi-transparent overlay, (third overlay 80). In this example, the third overlay is generated for an image of an island village previously captured with the camera, and the photographer would like to mimic the composition of this image. To create this overlay using the overlay menu 34 (FIG. 2), the photographer selects the desired image and assigns an opacity level of 25% to the entire overlay. In use, the third overlay is presented on the view-screen 22, allowing it to assist in the composition of the live image. When the live image is sufficiently composed, the photographer could either take the photograph or exit from the "overlay mode" and continue making other adjustments prior to taking the shot.

Optionally, the camera can save two distinct types of images. The first image type is the live image as recorded by the digital sensor, which would presumably share the compositional characteristics of the overlay. The second image is a composite of the overlay and the live image as had been previewed in the view screen. The second image type is analogous to a multiple exposure of a traditional film camera. This functionality simplifies the production of multiple exposures and frees the photographer to apply attention to the artistic concerns. Using this approach, the photographer can use any image in camera memory or otherwise accessible via the system. Stored images can be randomly and repeatedly accessed as overlay. Thus, a photographer could create a photograph of multiple exposures overlaid atop each other. For example, a single image could consist of ten images combined together, each image having an assigned opacity level.

The composite of the stored image and the live image can be previewed in real-time, allowing the photographer to make adjustments prior to depressing the shutter button, thereby minimizing the need for post-processing of the captured image. The photographer could optionally store both the live image data and the composited image data.

4. Full-Scale, Regional Opacity Overlay

Figure 12:
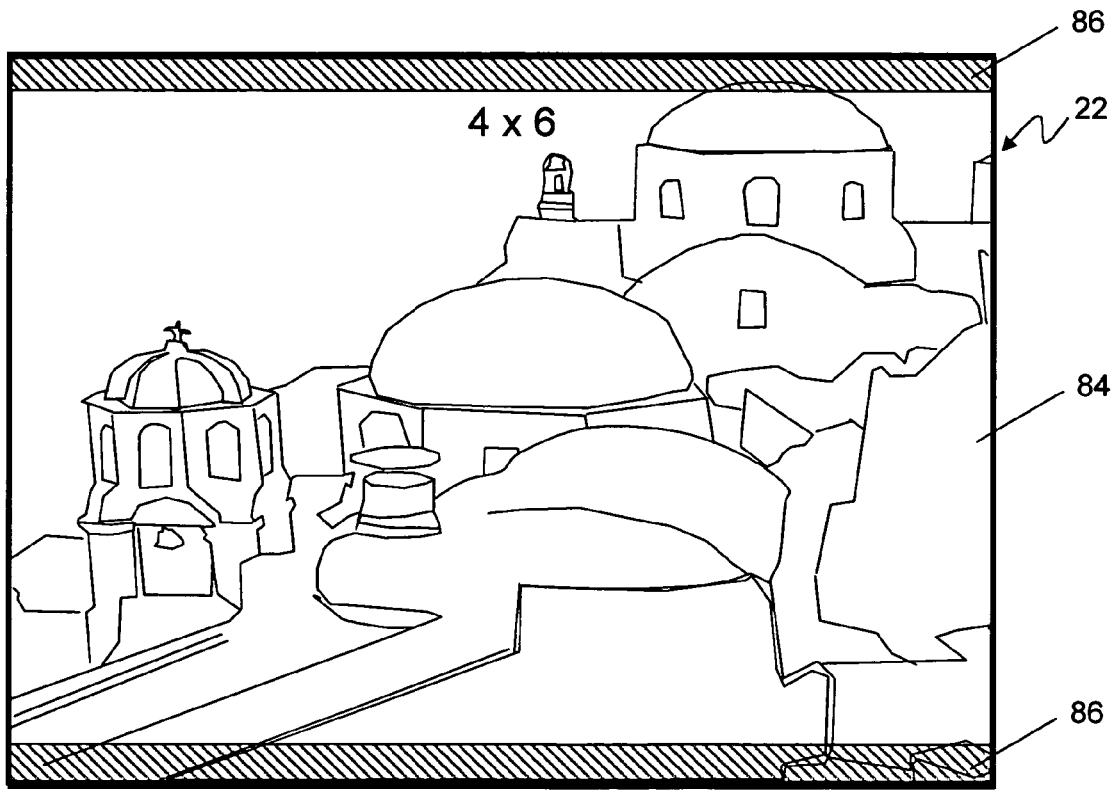
FIG. 12 is a screen shot similar to FIG. 11, depicting an overlay having an open area sized to an aspect ratio of 4×6.
Figure 13:
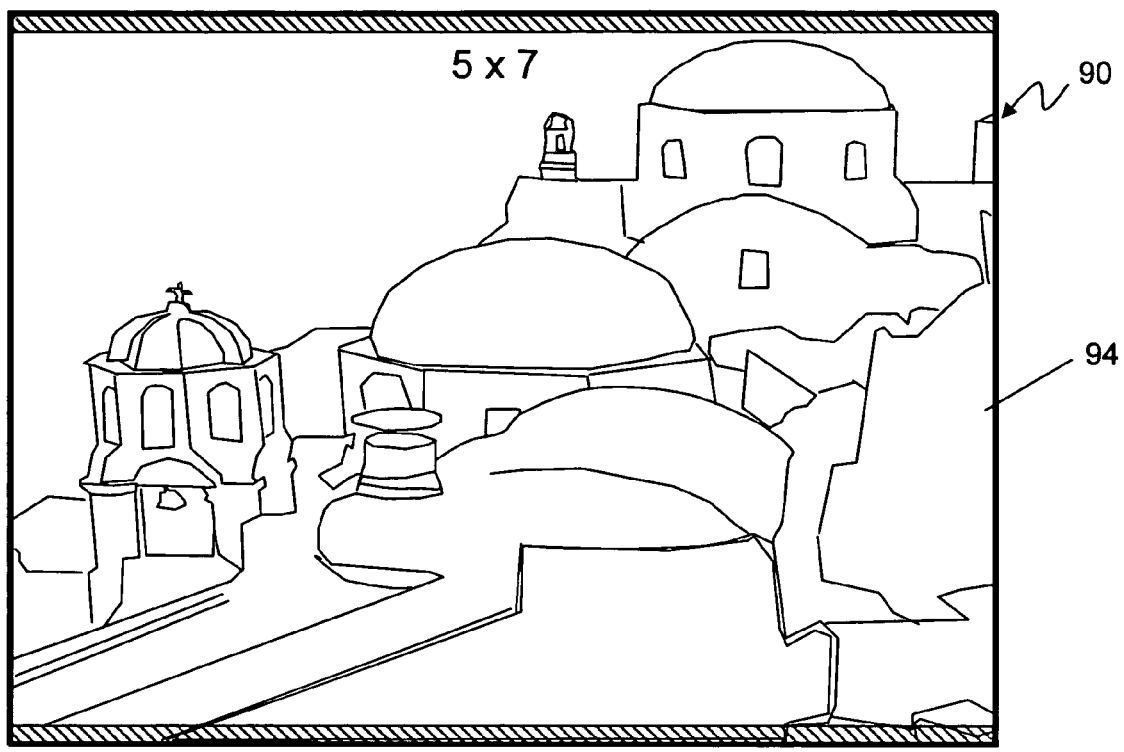
FIG. 13 is a screen shot similar to FIG. 11, depicting an overlay having an open area sized to an aspect ratio of 5×7.
Figure 14:
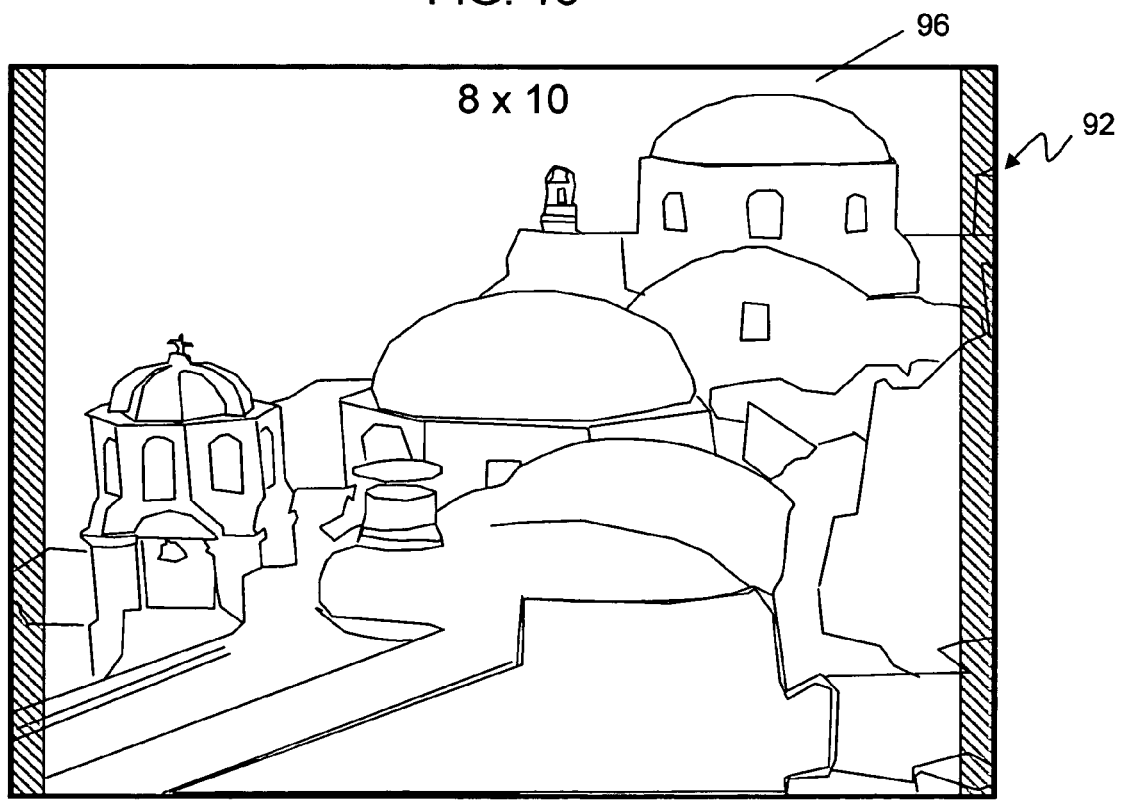
FIG. 14 is a screen shot similar to FIG. 1, depicting an overlay having an open area sized to an aspect ratio of 8×10.

With reference now to FIGS. 12-14, the system 21 includes overlays that aid in composing images for prescribed aspect ratios to include standard aspect ratios as well as custom aspect ratios. The photographer can compose the image within the parameters of the desired aspect ratio.

For example, an overlay 82 is shown in FIG. 12 that is configured to aid in composing images for prints having an aspect ratio of 4×6, e.g., "4×6" prints. The overall size of the overlay corresponds to the aspect ratio of the camera's default image configuration, as dictated by the camera's sensor, i.e., 3×4. However, the overlay defines an open region 84 with an opacity level of 0% and an aspect ratio of 4×6, such that the corresponding portion of the live image can be depicted on the view-screen and saved to the resulting image file unhindered. The overlay further includes shaded regions 86 provided for remaining area of overlay having an increased opacity level, e.g., 60 percent. The photographer can, therefore, compose the image with a particular print size in mind. When a photograph is taken, the camera can save several image files, including a first file simply depicting the scenic image without the overlay at the default aspect ratio, a second file depicting the scenic image and the overlay at the default aspect ratio, and a third file depicting the scenic image as defined by the open portion of the open region of the overlay.

With reference now to FIGS. 13 and 14, an overlay 90, depicted in FIG. 13, includes an open area 94 having an aspect ratio of 5×7 usable for composing 5×7 prints. The overlay 92, depicted in FIG. 14, includes an open area 96 having an aspect ratio of 8×10, usable for composing 8×10 prints. Moreover, additional custom overlays having an open area of any desired aspect ratio can be configured using the overlay menu 34. In other embodiments, other visual means of designating areas graphically can be used, e.g., hatching, marching ants, borders, and so on.

In selected embodiments, the user can select if the camera saves the entire image or performs an automatic crop to the previewed aspect ratio. Saving the entire image would result in a somewhat larger file size but would give identical results when printed on a zoom-in default printer. Saving the entire image preserves the potential to recompose the image later by performing an alternate crop utilizing regions that would have been discarded during the automatic crop process.

5. Editing Opacity of Selected Portions of Overlay

Figure 10A:
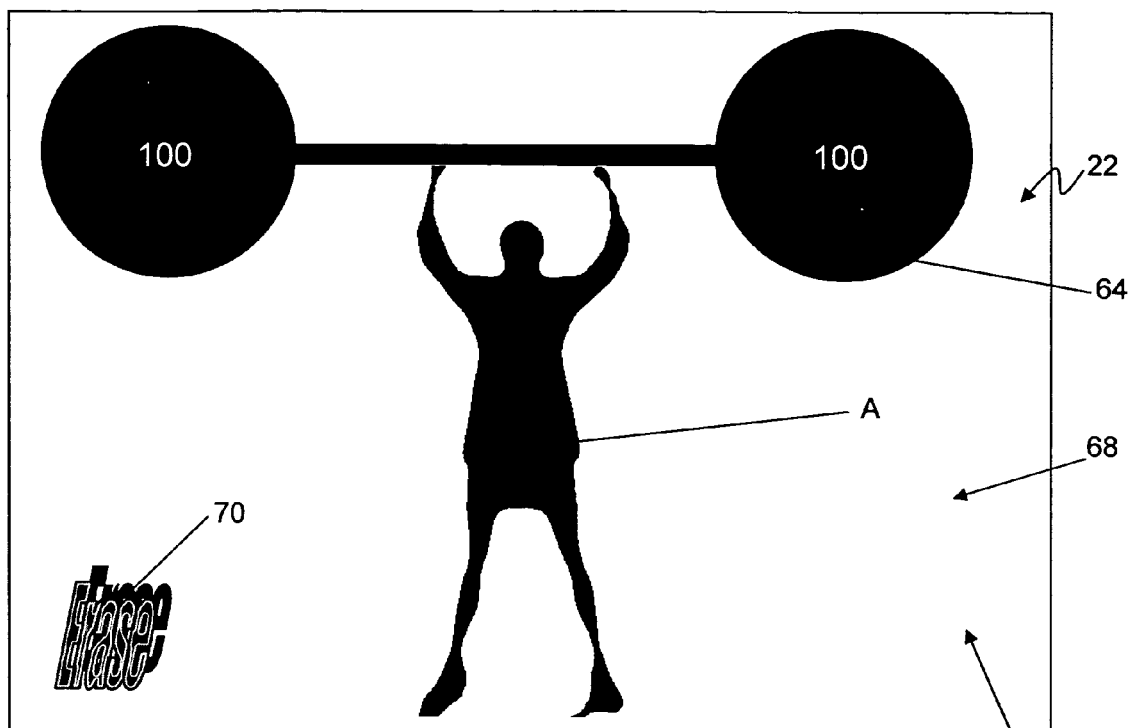
FIG. 10 is a screen shot of the view-screen of the camera of FIG. 1, depicting the composite image from FIG. 8 selected by the photographer for modification as an image overlay.
FIG. 10B is a screen shot similar to FIG. 10A, the composite image having a prescribed area in which pixels were "erased" by the photographer.
FIG. 10C is a screen shot similar to FIG. 10B, depicting a composite image combining the image overlay from FIG. 10B with a captured image having the subject's head aligned to reside in the area of "erased" pixels.
Figure 10B:
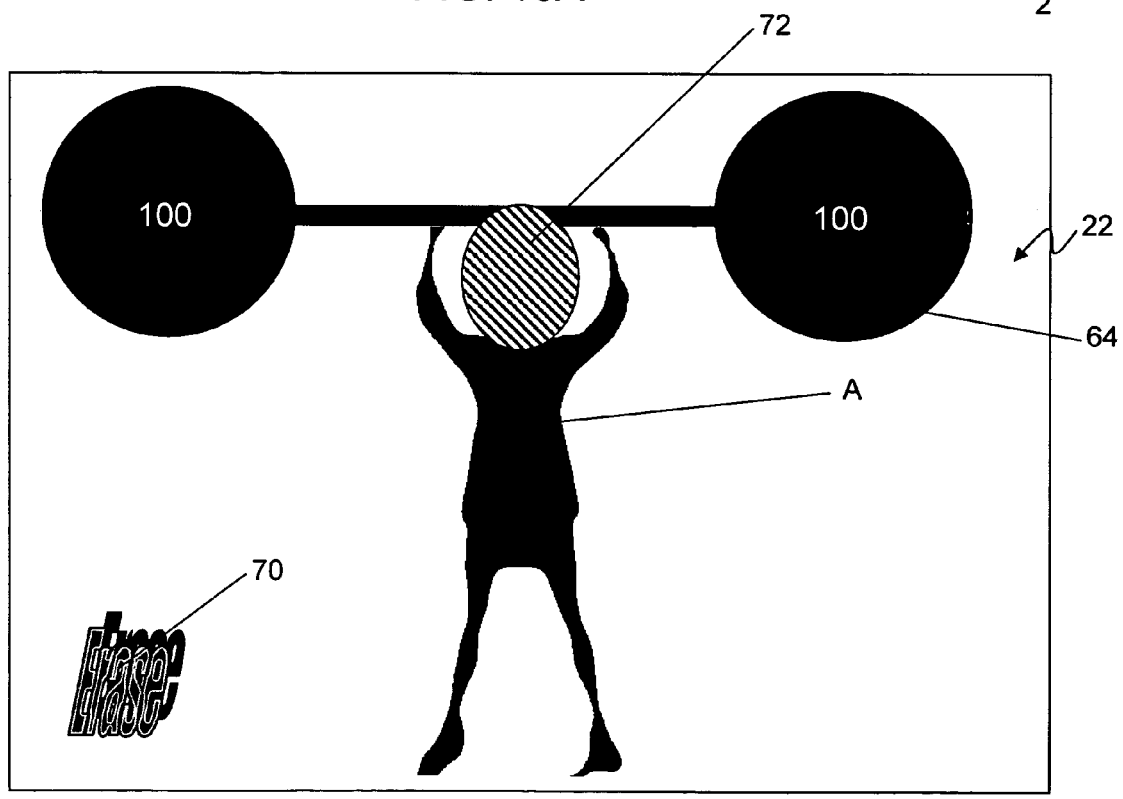
Figure 10C:
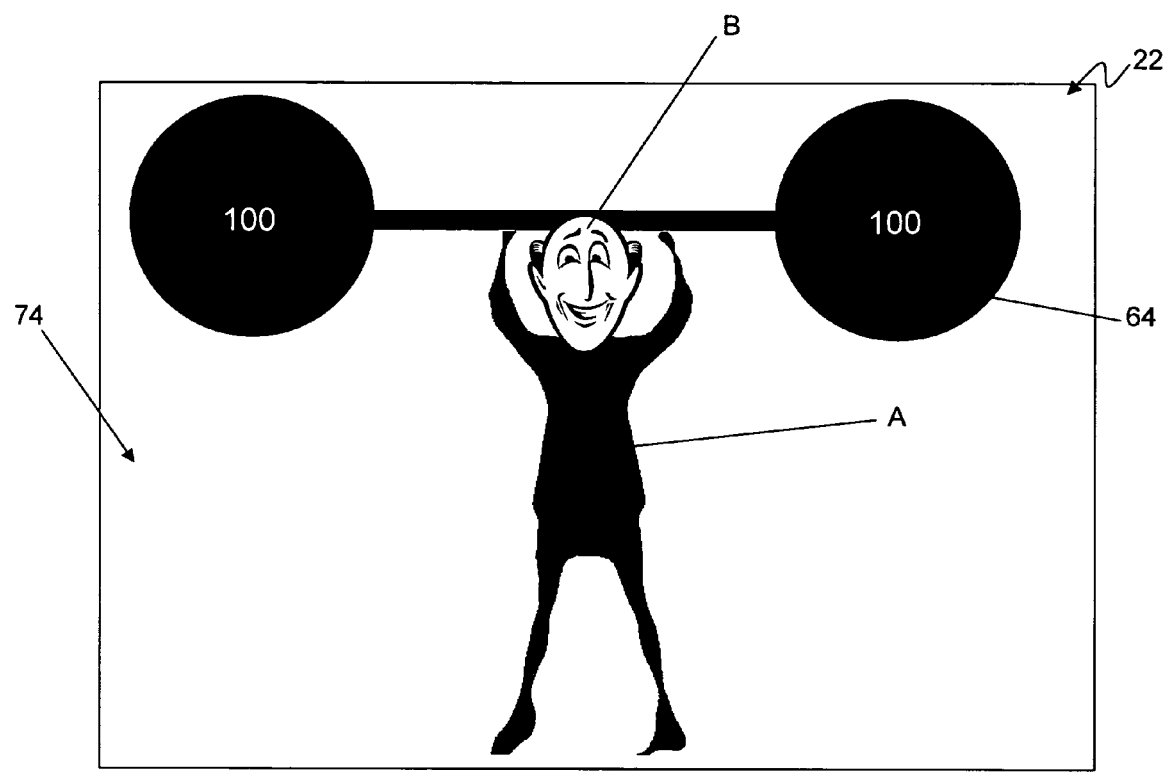

With reference to FIGS. 10A-10C, an example is provided, detailing features of editing selected portions of an overlay. More particularly, the camera 20 allows the photographer to independently adjust the intensity of selected areas of an overlay, as desired.

Using the overlay menu 34, a photographer can erase pixels from a stored image by selecting the "yes" option 67 at the fourth query. Once this option is selected, the image is presented on the view-screen 22, and the software feature for erasing pixels is activated. For purpose of illustration, this feature is sequentially depicted in FIGS. 10A-10C. In FIG. 10A, an image 68 is presented on the view-screen 22. As indicated by a designator 70 in the lower corner, the image is presented with the feature of erasing pixels activated. This image was taken using the dumbbell overlay 62 (FIG. 8) to appear as though person "A" is lifting the dumbbell. Assume, for example, the photographer would like to create a photograph in which the head of person "B" replaces the head of person "A." With the erasing feature activated and using the directional buttons 36 (FIG. 4), the photographer can designate a region, or regions, of the image from which to erase pixels, e.g., region 72 (FIG. 10B). In the present example, as shown in FIG. 10B, the designated region identified the pixels associated with the head of person "A." Once satisfied, the photographer selects the erase designator, erasing the identified pixels and returning to the overlay menu.

Once the remaining overlay queries are completed, the new overlay is presented for use. The original image of person "A" lifting the dumbbell remains in the camera's memory, unaltered. FIG. 10C depicts an image 74 created using this overlay, taken of person "B" in the manner discussed with reference to FIG. 2. The camera saves two digital files—the first file consists simply of an image of person "B," and the second file is the composite image 74.

To further illustrate, at an event, a photograph is taken of a baby in a bonnet. The photographer selects the saved image for conversion into an overlay. Using the system, the photographer can adjust global opacity, regional opacity, or both. In the foregoing example, the image of the baby in the bonnet is selected and presented on the view screen. The baby's face is erased, and the result is saved as an overlay image. Alternatively, the portion of the image corresponding to the baby's face can be set at a prescribed opacity level, e.g., 50 percent, allowing a corresponding portion of a live image (or another stored image) to be viewable. The overlay is saved to the camera independently of the original image of the baby in the bonnet. Using this overlay, the photographer can now compose other faces into the bonnet. The resulting images can be very humorous or even informative.

6. Color Subtract Feature

With reference again to FIG. 2, the camera 20 further includes a feature of overlay generation from an image file that enables a user to delete a predominant color. The camera prompts the photographer to select a saved image that will be edited to create an image overlay with opacity characteristics. In this embodiment, the "overlay creation" mode includes an "automatic" setting. When the graphic file is selected and the automatic setting is chosen, a processor 41 (FIG. 3) determines the predominant single color in the image. In the exemplary embodiment, this feature can be activated via the overlay menu 34 by identifying the appropriate file at the first query 38 and selecting the "Color Subtract" option 69 for the fourth query 52. Then, the selected image file will be displayed on the view-screen 22. The camera will automatically identify the predominant single color for removal and designates regions containing that color on the view screen with a graphical identification method such as "color flashing." Next, the photographer will be prompted if the proper color was removed. The user is prompted to "subtract this region? Yes/no/cancel." If "yes" is selected, the predominant region is subtracted and the result may be stored as an image overlay. If "no" is selected, the region of secondary dominance is designated and the prompt is renewed. In this manner, the user can subtract large regions rapidly.

To further illustrate, if the user subtracted the predominant gray background a custom designed grid becomes immediately available as an image overlay. The user would be able to compose live images against this grid. Because the grid was created at the same resolution as the digital sensor, the overlay could also be composited in fine detail to the final image and used immediately for many purposes such as scientific measurement.

Moreover, an image file in the camera's digital memory 40 could be modified in a similar manner. In one approach, a selected image could be modified to include a predominant single color, e.g., cyan, at desired locations throughout the image using the "modify" option 71 of the third query 46 of the overlay menu. This feature allows the photographer to interact with the image, adding colors, icons, and other indicia. The user could manually designate a color to be removed with a pointer or eyedropper cursor, as are well known in the art. Alternatively, blocks of a single color could be added to the image, covering portions of the image. Then, using the "Color Subtract" option 69, the designated color blocks can be removed. In another example, a user could download a photograph of Mt. Rushmore from the internet. On a personal computer, the user could operate a simple paint program to apply a color to one or more of the president's faces, preferably using a color not otherwise present in the image. As described above, the user could rapidly transfer the image to the camera and create an entertaining overlay image.

7. Edge Detect Feature

With reference to FIGS. 1, 2, and 15A-15C, the camera 20 further includes a feature for overlay generation initiated by selecting "edge detect" 73 from the fourth query 52 of the overlay menu 34. This feature is configured to generate a line drawing based off an image file by detecting edges between regions of high contrast. To initiate, at the first query 38, the photographer selects a saved image that will be edited to create an image overlay with opacity characteristics. In this embodiment, the "overlay creation" mode includes an "automatic" setting. When the graphic file is selected and the automatic setting is chosen, a processor 41 (FIG. 3) utilizes an "edge-detect" algorithm to determine the location of edges in the image field. Such edges are algorithmically identified by determining where regions are changing color or tone along a path. Such edge-paths are typically displayed in a selectable or uncommon color. The edges could be displayed against the original image or against a neutral background. In the exemplary embodiment, the system presents three slider bars that allow the user to vary the tolerance of the edge hardness that would be displayed as well the opacity of the edges and the color of the edge-delineating pixels. Optionally, a further step would allow the user to manually delete extraneous pixels, and a final step would allow the "edge map" to be saved as an overlay.

The present example relates to photography for a catalog display. In catalogs, it is often desirable to minimize inconsistencies between photographs. Compositional consistency enhances the ability of the consumer to compare the merchandise. FIG. 15A depicts a photograph 75 of women's shoes.

Traditionally, consistency among several such photographs would be achieved simply by marking shoe positions on the floor and mounting the camera on a tripod. However, if a floor mark was accidentally removed or a tripod was accidentally struck, re-establishment of the composition becomes problematic. The problem of re-establishing the composition is increased when multiple photo sessions occur at different times or in different places. In any event, the traditional method may properly identify the shoe arrangement but it will often fail to identify the proper leg position.

Using the "edge-detect" feature 73 (FIG. 2) in conjunction with the photograph 75 of FIG. 15A, a line overlay 77 is created that can serve as to aid in composition for further images. When the photograph 75 is selected from digital memory and the automatic setting is chosen, a processor 41 (FIG. 3) utilizes an "edge-detect" algorithm to determine the location of edges in the image field. Such edges are algorithmically identified by determining where regions are changing color or tone along a path. Such edge-paths can be displayed in a selectable or uncommon color, for example. The edges can be displayed against the original image or against a neutral background, as depicted in image 79 of FIG. 15B. By means of multiple slider bars (not shown), the user could vary the tolerance of the edge hardness that would be displayed as well the opacity of the edges and the color of the edge-delineating pixels. A further step would allow the user to manually delete extraneous pixels as shown in FIG. 15C.

8. Compare Mode

With continued reference to FIGS. 1-2, the system of the camera 20 includes a "compare mode" that toggles between the selected overlay and the live image without application of the overlay. As mentioned above, compare mode can be selected at the third query. 46 of menu 34. In this mode, rather than a constant depiction, the overlay is iteratively presented. This iteration can take place automatically or initiated manually, e.g., via a toggle button 55.

In the example presented, the overlay is opaque. Using the toggle button, the photographer can manually toggle between the stored image overlay and the live image in order to compare and make adjustments. In automatic mode, the camera will toggle at a pre-determined or user-definable rate between the selected image and the live image. Optionally, the photographer can override the automatic toggling, e.g., via the toggle button. When the live image was sufficiently composed, the photographer could either take the shot or exit from the "compare mode" and continue making other adjustments prior to making the exposure.

9. Auto-Compositing Feature

With reference now to FIG. 16 through FIG. 20B, an example is provided illustrating the auto-compositing feature of the system 21. The camera 20 includes a sensor assembly 25 configured to capture a digital representation of the camera's field-of-view. However, due to performance characteristics of the sensor assembly, i.e., exposure latitude, the captured image of the camera's field-of-view can be non-ideal, particularly when there is a large disparity between bright and dark regions. In these situations, the captured image can include over-exposed and under-exposed regions. The auto-compositing feature aids in creating a composite image free of such improperly exposed regions.

Figure 16:
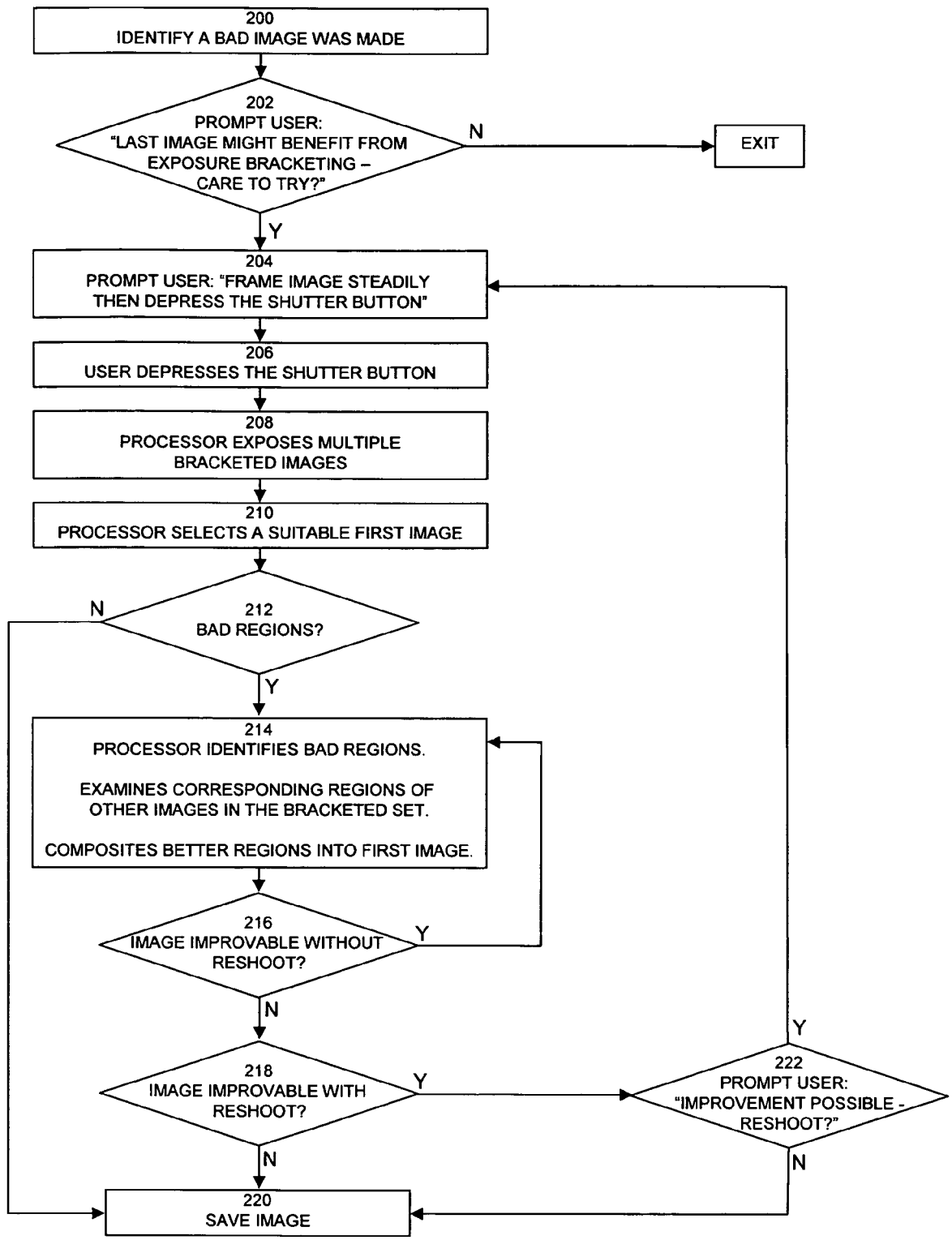
FIG. 16 is a simplified flow chart of an exemplary method for exposure bracketing implemented by the camera of FIG. 1.
Figure 17A:
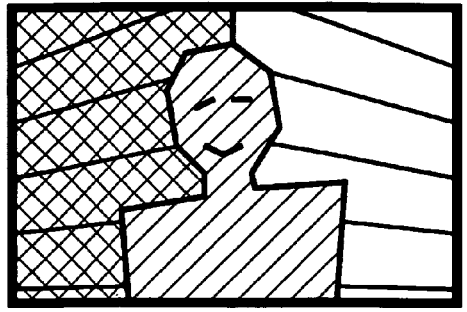
FIG. 17A is a desired image, depicting a person standing in front of the corner of a building, having large disparity between bright and dark regions.

FIG. 16 depicts a flowchart for implementing the auto-compositing feature of system 21. In the exemplary embodiment, the system can composite images taken at various exposure settings to generate a desired image having disparity between bright and dark regions beyond the maximum latitude of the sensor assembly 25 of the camera. In this example, FIG. 17A depicts a desired image of a person standing in front of the corner of a building, having large disparity between bright and dark regions. Bright light streams onto the building wall depicted in the right side of the photograph. On the left side of the photograph the building wall is in dark shadows, indicated by the cross-hatched lines. At the center of the photograph the person is in moderate light, perhaps shade, indicated by the single-hatched lines.

Figure 17B:
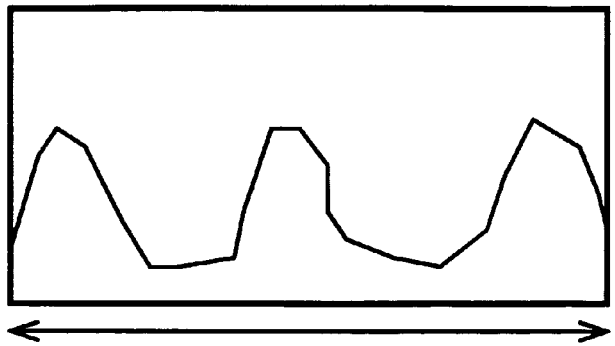
FIG. 17B is a simplified histogram chart of the image of FIG. 17A.

FIG. 17B is a histogram that classifies the brightness of the image of FIG. 17A by area. Such histograms typically plot darker values on the left and brighter values on the right. By coincidence, the dark values at the left of the photograph correspond primarily to the hump near the left of the histogram. The light values at the right of the photograph correspond primarily to the hump near the right of the histogram. The moderate light on the person corresponds to the center hump. The arrow at the bottom of the histogram illustrates the tremendously wide latitude required to capture this image, beyond the maximum latitude of the sensor assembly 25 of the camera.

Figure 18B:
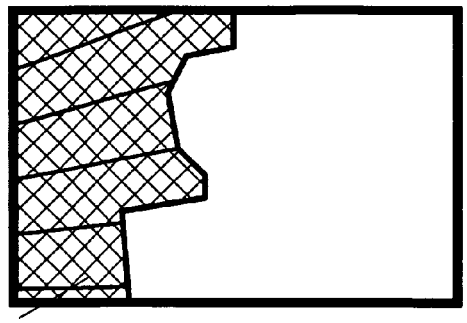
FIG. 18B is a simplified histogram chart of the image of FIG. 18A.
Figure 18B:
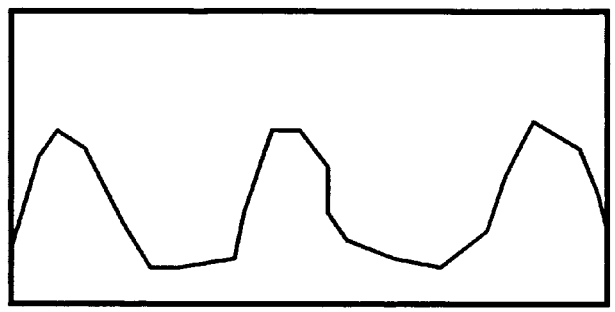
Figure 19A:
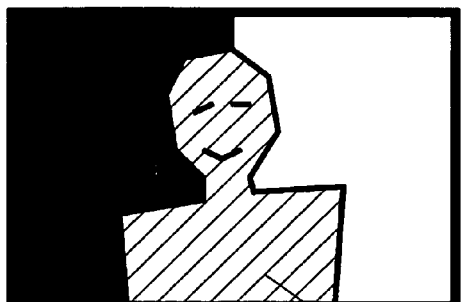
FIG. 19A, is an image, similar to FIG. 17A, captured by the camera of FIG. 1 at a second exposure setting.
Figure 19B:
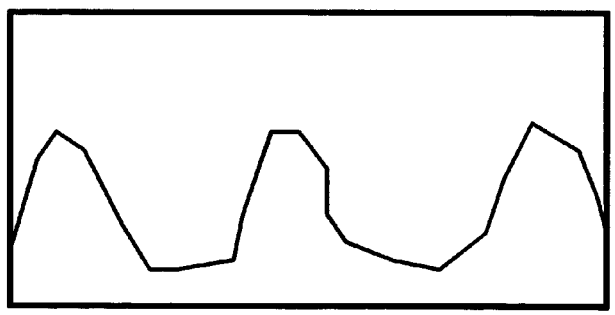
FIG. 19B is a simplified histogram chart of the image of FIG. 19A.
Figure 20A:
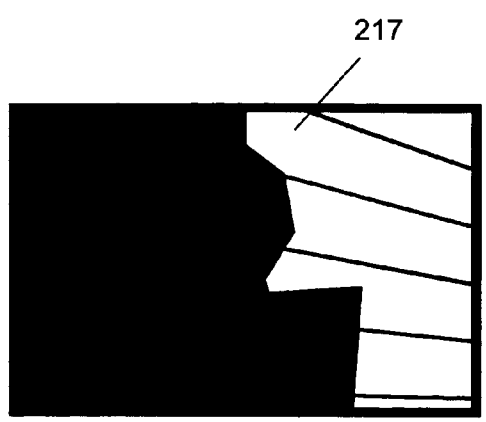
FIG. 20A, is an image, similar to FIG. 17A, captured by the camera of FIG. 1 at a third exposure setting.
Figure 20B:
FIG. 20B is a simplified histogram chart of the image of FIG. 20A.

FIGS. 18A, 19A, and 20A depict resulting images captured by camera 20, at various exposure settings. FIG. 18A represents the result of photographing the image with a non-ideal camera at a first exposure setting. The exposure has been set to capture the dark left side of the building. The remaining portions of the image are extremely overexposed. The camera's latitude at the first exposure setting is indicated by arrow of FIG. 18B. Notably, this latitude is less than is required to capture the desired image of FIG. 17A. In FIG. 19A the exposure has been set to capture the moderate light of the person but the details of the building are underexposed on the left and overexposed on the right. In FIG. 20A the exposure has been set to capture the bright side of the building at the right of the photograph. The left side and the person are underexposed.

Referring to the flowchart 100 (FIG. 16), the auto-compositing feature is initiated by identifying a potentially bad image, step 200. Such identification comprises an algorithm that identifies significant bad regions as are evident in FIGS. 18A, 19A, and 20A. At step 202, the camera prompts the user to make a new exposure-bracketed attempt at the shot or to exit back to normal camera function. If the user chooses to attempt the improved image, further guidance prompts may be presented as illustrated in step 204. Such guidance may also comprise using a tripod. When ready, the user depresses the shutter, step 206.

In step 208, under the guidance of the processor 41 (FIG. 3), the camera exposes and saves multiple bracketed images, each at a distinct exposure setting. The processor examines all the captured images and selects a first image using an algorithm that typically gives the best results (step 210). In this example, the image of FIG. 18A is selected. In other embodiments, the system can randomly select one of the images for evaluation. In yet other embodiments, the system can utilize an algorithm that would evaluate and compare characteristics of the bracketed set in order to establish the most appropriate first image with which to begin the compositing process. Such selection algorithms could evaluate with respect to the compositing algorithms in order to determine the combination that would provide the most pleasing final images.

At step 212, the image is evaluated and may branch to saving the image at step 220. In the image of FIG. 18A, an overexposed region 213 is identified. In step 214, the overexposed region will be measured against comparable regions in a corresponding location in the other bracketed images. In our example the overexposed region 213 of FIG. 18A would be replaced by the region 215 of FIG. 19A depicting the image of the person.

At step 216, the image is reevaluated by the processor to determine if additional compositing would improve it. In the present example, the system would yet identify a large portion of overexposed right region and, thus, would loop the processor back to step 214. Then, the system would composite the properly exposed right region 217 from FIG. 19A into the image.

Returning back to step 216, no further improvement would be possible without a re-shoot. A final evaluation at step 218 would determine if the final image might be improvable with a re-shoot. If so, the user would get a preview of the current result on the view screen and be prompted with the opportunity to re-shoot at step 222. If the user chose to re-shoot, the camera would make additional adjustments of exposure and number of shots in order to achieve a higher likelihood of success. If the camera determines that a re-shoot would not improve the shot, or if the user elects to not re-shoot, the image is saved at step 220. The compositing process would obviously be benefited by algorithms that can smooth the transition between the composited sections. These algorithms are widely known. It is possible that the quality of such composites may, in many cases, obviate the need for later editing. In any case, the auto-composited image would provide satisfactory assurance to the photographer that the bracketed exposures contained adequate image data for later compositing.

It should be appreciated from the foregoing that the present invention provides a digital camera comprising an image system having a unique combination of features that aid in generating creative, high-quality images. The system presents a variety of overlays, each having prescribed attributes, e.g., ranging in size, opacity, and functionality, and from iconic overlays to full-scale overlays having varied opacity. The overlays can be used as an aid in composing a live image for digital capture, either as a constant or intermittent presence on the view-screen of the camera. In an exemplary embodiment, the camera can create a composite photograph in which a live image and the overlay are combined together. In an independent aspect, the camera can include an auto-compositing feature that aids in creating images free of improperly exposed regions. Thus, a photographer can create and combine images "on location" in a unique manner.

Although the invention has been disclosed in detail with reference only to the preferred embodiments, those skilled in the art will appreciate that various other embodiments can be provided without departing from the scope of the invention. Accordingly, the invention is defined only by the claims set forth below.

I claim:

1. A handheld digital camera, comprising:
   a processor;
   a digital memory in communication with the processor;
   a view-screen in communication with the processor and configured to present images from the field-of-view of the camera;
   a plurality of image files stored in the digital memory; and
   a user interface executable by the processor and configured to enable selection of a stored image file from the plurality of image files, the interface configured (a) to generate an overlay by automatically detecting and removing a predominate color from the selected image file resulting in at least one void in the resulting overlay coinciding with a location in the selected image file where the predominate color resided, and (b) to depict the resulting overlay on the view-screen in conjunction with live image data corresponding to the field-of-view of the camera such that the image data on the view-screen is shown through the void of the resulting overlay.

2. A camera as defined in claim 1, wherein the camera can save two digital files to the digital memory upon taking a photograph, the first file comprising the image data corresponding to the field-of-view of the camera and the second file comprising a composite image of the overlay superimposed on the image data corresponding to the field-of-view of the camera.

3. A camera as defined in claim 1, wherein the overlay has a user assignable opacity level.

4. A camera as defined in claim 1, wherein the interface configured to depict the image file having a color of secondary dominance removed, resulting in an overlay depicted on the view-screen in conjunction with image data corresponding to the field-of-view of the camera such that the image data on the view-screen is shown in portions in which the color of secondary dominance was removed.

5. A camera as defined in claim 1, wherein the plurality of image files includes at least one file usable as an overlay sized to correspond to a default image size for the digital camera such that the assigned opacity level of the overlay affects the entirety of corresponding image data.

6. A camera as defined in claim 1, wherein the overlay can be presented on the view-screen as a constant or an intermittent presence.

7. A camera as defined in claim 1, wherein the plurality of image files includes at least one print overlay having one or more regions of altered appearance, including an unaltered region and an altered region, the altered region of the overlay having an altered appearance relative to the unaltered region, the unaltered region having a prescribed aspect ratio corresponding to a photograph print size.

8. A camera as defined in claim 7, wherein the plurality of image files includes multiple print overlays, wherein the open region of each print overlay has a distinct aspect ratio.

9. A camera as defined in claim 1, wherein the user interface enables automated creation of a line overlay from an image file via an edge-detect feature in which the line overlay is a line drawing of the image of the image file.

10. A camera as defined in claim 9, wherein the edge-detect feature analyzes the image file by identifying borders between regions of differing color and tone of a prescribed value, and defines, in the line overlay, a line of prescribed opacity and color corresponding to the identified border.

11. A camera as defined in claim 9, wherein the user can set the prescribed value used for identifying the border between regions in the image file.

12. A camera as defined in claim 11, wherein the user can set the opacity value and the color for the line overlay.

13. A method of generating an overlay for use with a digital camera, comprising:
   selecting a stored image file from digital memory of a digital camera for use as an overlay atop a live image corresponding to the field-of-view of the camera; and
   generating an overlay by automatically detecting and removing a predominate color from the selected image file resulting in at least one void in the resulting overlay; and
   depicting the resulting overlay on the view-screen in conjunction with live image data corresponding to the field-of-view of the camera such that the image data on the view-screen is shown through the void of the resulting overlay.

14. A method as defined in claim 13, further comprising saving two digital files to the digital memory upon taking a photograph, the first file comprising the image data corresponding to the field-of-view of the camera and the second file comprising a composite image of the overlay superimposed on the image data corresponding to the field-of-view of the camera.

15. A method as defined in claim 13, wherein the overlay has a user assignable opacity level.

16. A method as defined in claim 13, further comprising depicting the image file having a color of secondary dominance removed, resulting in an overlay depicted on the view-screen in conjunction with image data corresponding to the field-of-view of the camera such that the image data on the view-screen is shown in portions in which the color of secondary dominance was removed.

17. A method as defined in claim 13, wherein the plurality of files includes at least one file usable as an overlay sized to correspond to a default image size for the digital camera such that the assigned opacity level of the overlay affects the entirety of corresponding image data.

18. A method as defined in claim 13, wherein the overlay can be presented on the view-screen as a constant or an intermittent presence.

19. A method as defined in claim 13, wherein the plurality of files includes at least one print overlay having one or more regions of altered appearance, including an unaltered region and an altered region, the altered region of the overlay having an altered appearance relative to the unaltered region, the unaltered region having a prescribed aspect ratio corresponding to a photograph print size.

20. A method as defined in claim 13, further comprising automated creation of a line overlay from an image file via an edge-detect feature in which the line overlay is a line drawing of the image of the image file.

21. A method as defined in claim 20, wherein the plurality of files includes multiple print overlays, wherein the open region of each print overlay has a distinct aspect ratio.

22. A method as defined in claim 20, wherein the edge-detect feature analyzes the image file by identifying borders between regions of differing color and tone of a prescribed value, and defines, in the line overlay, a line of prescribed opacity and color corresponding to the identified border.

23. A method as defined in claim 22, wherein the user can set the prescribed value used for identifying the border between regions in the image file.

24. A method as defined in claim 23, wherein the user can set the opacity value and the color for the line overlay.

25. A method as defined in claim 13, wherein the interface is configured to query the user whether to maintain removal of the predominate color for generating of the resulting overlay.

26. A method as defined in claim 25, wherein the interface is configured to query the user whether to remove of a color of secondary dominance for generating of the resulting overlay.

27. A method as defined in claim 25, wherein the interface is configured to query the user to select a color from removal for generating an overlay.

28. A camera as defined in claim 1, wherein the interface is configured to query the user whether to maintain removal of the predominate color for generating of the resulting overlay.

29. A camera as defined in claim 28, wherein the interface is configured to query the user whether to remove of a color of secondary dominance for generating of the resulting overlay.

30. A camera as defined in claim 28, wherein the interface is configured to query the user to select a color from removal for generating an overlay.

* * * * *